US011458486B2

(12) United States Patent
Ernst et al.

(10) Patent No.: US 11,458,486 B2
(45) Date of Patent: Oct. 4, 2022

(54) DUAL CYCLONE SEPARATOR

(71) Applicant: JCI CYCLONIC TECHNOLOGIES LTD., Calgary (CA)

(72) Inventors: Kenneth Alfred Ernst, Calgary (CA); Matthew James Green, Calgary (CA); Morley Everett Kocken, Calgary (CA); Brendan Alexander Connolly, Calgary (CA)

(73) Assignee: JCI CYCLONICS LTD., Calgary (CA)

( * ) Notice: Subject to any disclaimer, the term of this patent is extended or adjusted under 35 U.S.C. 154(b) by 16 days.

(21) Appl. No.: 17/332,040

(22) Filed: May 27, 2021

(65) Prior Publication Data

US 2021/0283623 A1 Sep. 16, 2021

Related U.S. Application Data

(63) Continuation-in-part of application No. 15/227,799, filed on Aug. 3, 2016, now abandoned.

(51) Int. Cl.

*B01D 19/00* (2006.01)
*B04C 5/28* (2006.01)
*B04C 5/30* (2006.01)
*B04C 5/14* (2006.01)
*B04C 5/04* (2006.01)

(Continued)

(52) U.S. Cl.

CPC .................. *B04C 5/28* (2013.01); *B04C 5/04* (2013.01); *B04C 5/107* (2013.01); *B04C 5/12* (2013.01); *B04C 5/14* (2013.01); *B04C 5/30* (2013.01)

(58) Field of Classification Search

CPC .. B04C 5/28; B04C 5/04; B04C 5/107; B04C 5/12; B04C 5/14; B04C 5/30; B04C 5/13

See application file for complete search history.

(56) References Cited

U.S. PATENT DOCUMENTS 4,134,827 A * 1/1979 Frykhult .................. B04C 5/04 209/729
4,146,469 A * 3/1979 Kaiser ...................... D21D 5/26 209/730

(Continued)

*Primary Examiner* — Dung H Bui
(74) *Attorney, Agent, or Firm* — Field LLP

(57) ABSTRACT

A cyclonic separator is taught for separation of a mixed liquid phase/gas phase process stream. The cyclonic separator comprises an outer shell, at least two cyclonic chambers located within the outer shell, each cyclonic chamber having an upper end and a lower end; a single, common tangential inlet passing tangentially through the outer shell and into each of the at least two cyclonic chambers, proximal the upper ends thereof; a gas outlet tube located at least partially within each cyclonic chamber, extending axially from a lower gas outlet end located below the tangential inlet, to an upper gas outlet end extending out of each of the at least two cyclonic chambers, said upper gas outlet ends being in fluid communication with a common gas chamber located above the outer shell; and a circumferential recycle opening formed around and through a thickness each gas outlet tube, in a portion of each gas outlet tube located axially between the upper end of cyclonic chambers and the common gas chamber, said recycle opening thus being in fluid communication with an inside cavity of the outer shell.

14 Claims, 7 Drawing Sheets

(51) Int. Cl.
*B04C 5/107* (2006.01)
*B04C 5/12* (2006.01)

(56) References Cited

U.S. PATENT DOCUMENTS

| | | | | |
|---|---|---|---|---|
| 7,470,299 | B2 * | 12/2008 | Han | B04C 5/26<br>55/459.1 |
| 2005/0173335 | A1 * | 8/2005 | Rogers | B04C 5/12<br>210/512.1 |
| 2016/0051994 | A1 * | 2/2016 | Toda | B04C 5/04<br>55/447 |
| 2019/0262841 | A1 * | 8/2019 | Shu | B04C 5/185 |
| 2021/0197214 | A1 * | 7/2021 | Rock, Jr. | F02M 35/0223 |

* cited by examiner

DUAL CYCLONE SEPARATOR

CROSS REFERENCE TO RELATED APPLICATIONS

This application is a continuation in part of U.S. application Ser. No. 15/227,799 filed Aug. 3, 2016 entitled Dual Cyclone Separator.

FIELD

The present disclosure relates to a dual cyclone separator.

BACKGROUND

Cyclonic separator systems are commonly used to segregate immiscible phases of a process stream, such as when a process stream comprises a mixed liquid phase and gas phase. Separator systems are commonly used to separate immiscible entrained liquids from a gas phase of a mixed gas/liquid process stream, wherein the process stream enters cyclonic chambers through inlets that are tangential to the curvature of each of the cyclonic chambers. As a result of the velocity and the tangential angle at which the liquid/gas process stream enters the cyclonic chamber, centrifugal forces act on the process stream and cause it to spin around the curvature of the cyclonic chamber.

Centrifugal forces acting on each of the immiscible phases in the process stream, cause the phases to move either away from or towards the centre of the cyclonic chamber. A difference in the mass and densities of phases of the process stream cause the heavier phases to coalesce on the inner wall of the cyclonic chamber and travel in a downwards direction through the cyclonic chamber due to the force of gravity, while the lighter, or gaseous, phase(s) of the gas phase tend to remain closer to the centre of the cyclonic chamber forming a central upward moving column of lighter phase that exit through an aperture positioned in the upper covering of the cyclonic chamber.

To ensure effective light/heavy phase separation, the incoming process stream needs to flow at high velocity to create a greater centrifugal force for separation of the heavier phase from the lighter phase. As well, the gas outlet aperture must be designed to a minimum size based on how much lighter phase is being separated out. There are further limits to the design of the tangential inlets to each of the cyclonic chambers to create the desired high momentum and flow rate of the incoming process fluid.

An example of a prior art, single cyclonic separator can be seen in U.S. Pat. No. 3,481,118. An example of a prior art multicyclonic separator can be seen in U.S. Pat. No. 3,793,812.

Since the sizing of cyclonic chambers is a precise science, height and diameter dimensions are limited based on the stream to be separated, velocity and volume available. Typically, when using multiple separators, these specific size requirements lead to a height and diameter that is often too narrow and tall to withstand the high vibration commonly experienced in the separation environment. On example of such high vibration environment is when cyclone separators are used with reciprocating compressor scrubbers.

Separator dimensions can also limit the size of the lower area of the cyclonic separator, called a sump, which is used to collect liquids that are separated out of the entrained gas-liquid stream fed to the separator. Limitations to sump size lead to less than desirable residence time to separate out any entrained gases that may be trapped in the falling liquid.

As well, the external body of cyclonic separators must meet strict pressure vessel and welding requirements to ensure a level of integrity due to the high internal pressure, vibrations and velocities used in cyclonic separation. Involute or tangential inlets commonly used on cyclonic separators connect with the separator body in such a way that can prove difficult to meet the reinforcement requirements that are needed for the design of a pressure vessel.

As such, there is a need for an improved design of a cyclonic separator for separation of a liquid phase from a gas phase in a mixed process stream.

SUMMARY

The present disclosure thus provides a cyclonic separator for separation of a mixed liquid phase/gas phase process stream. The cyclonic separator comprises an outer shell, at least two cyclonic chambers located within the outer shell, each cyclonic chamber having an upper end and a lower end; a single, common tangential inlet passing tangentially through the outer shell and into each of the at least two cyclonic chambers, proximal the upper ends thereof; a gas outlet tube located at least partially within each cyclonic chamber, extending axially from a lower gas outlet end within each cyclonic chamber and below the tangential inlet, to an upper gas outlet end extending out of each of the upper end of the at least two cyclonic chambers, said upper gas outlet ends being in fluid communication with a common gas chamber located above the outer shell; and a circumferential recycle opening formed around and through a thickness each gas outlet tube, in a portion of each gas outlet tube located axially between the upper end of cyclonic chambers and the common gas chamber, said recycle opening thus being in fluid communication with an inside cavity of the outer shell.

It is to be understood that other aspects of the present disclosure will become readily apparent to those skilled in the art from the following detailed description, wherein various embodiments of the disclosure are shown and described by way of illustration. As will be realized, the disclosure is capable for other and different embodiments and its several details are capable of modification in various other respects, all without departing from the spirit and scope of the present disclosure. Accordingly the drawings and detailed description are to be regarded as illustrative in nature and not as restrictive.

BRIEF DESCRIPTION OF THE DRAWINGS

A further, detailed, description of the disclosure, briefly described above, will follow by reference to the following drawings of specific embodiments of the disclosure. The drawings depict only typical embodiments of the disclosure and are therefore not to be considered limiting of its scope. In the drawings.

The drawings are not necessarily to scale and in some instances proportions may have been exaggerated in order more clearly to depict certain features.

DETAILED DESCRIPTION OF VARIOUS EMBODIMENTS

The description that follows and the embodiments described therein are provided by way of illustration of an example, or examples, of particular embodiments of the principles of various aspects of the present disclosure. These examples are provided for the purposes of explanation, and not of limitation, of those principles and of the disclosure in its various aspects.

With reference to the figures, the present disclosure provides a dual cyclonic separator system 2 having a common tangential inlet. The present separator system 2 combines two cyclonic separators or cyclonic chambers 4*a,* 4*b* in parallel, having a single common involute/tangential inlet 8. The pair of cyclonic chambers 4*a,* 4*b* are placed within an outer shell 6. The shell 6 preferably takes the shape of a vertically oriented cylinder, although it would be possible for the shell to take on other shapes such as a vertically oriented rectangular prism, without departing from the scope of the present disclosure.

The individual separators 4*a,* 4*b* are still sized in accordance with sizing specifications based on properties of the streams to be separated, including but not limited to relative densities and phases, inlet velocity, inlet pressure. However, by housing the pair of cyclonic chambers 4*a,* 4*b* within a shell 6, the dimensions of the shell 6 can be varied to provide stability and vibration resistance as required by the environmental conditions. Thus, by placing the cyclonic chambers 4*a,* 4*b* within a shell 6, there is more sizing flexibility.

The tangential inlet 8 is hollow and passes through the shell 6 and into fluid communication with an upper end 4*ai* and 4*bi*, each of cyclonic chambers 4*a,* 4*b.* The inlet 8 preferably has a circular cross sectional geometry, although a square or rectangular cross section geometry is also possible and within the scope of the present disclosure. While the figures illustrate the tangential inlet 8 as being at a right angle 8*a* to a length of the shell 6 and to a length of the cyclonic chambers 4*a,* 4*b,* it is also possible for the tangential inlet 8 to slope downwards at an angle greater than 90 degrees to the length of either the shell 6, or the cyclonic chambers 4*a,* 4*b,* or both, thus enhancing the gravity pull on the heavier liquid phase of the mixed process stream as it enters the separators 4*a,* 4*b.*

The process stream enters the separator system 2 via tangential inlet and generally divides into portions that enter each of the separators 4*a,* 4*b.* In a more preferred embodiment, a divider 20 may be inserted or other means may be used to divide the process stream into each of the cyclonic chambers 4*a,* 4*b.*

Figure 1:
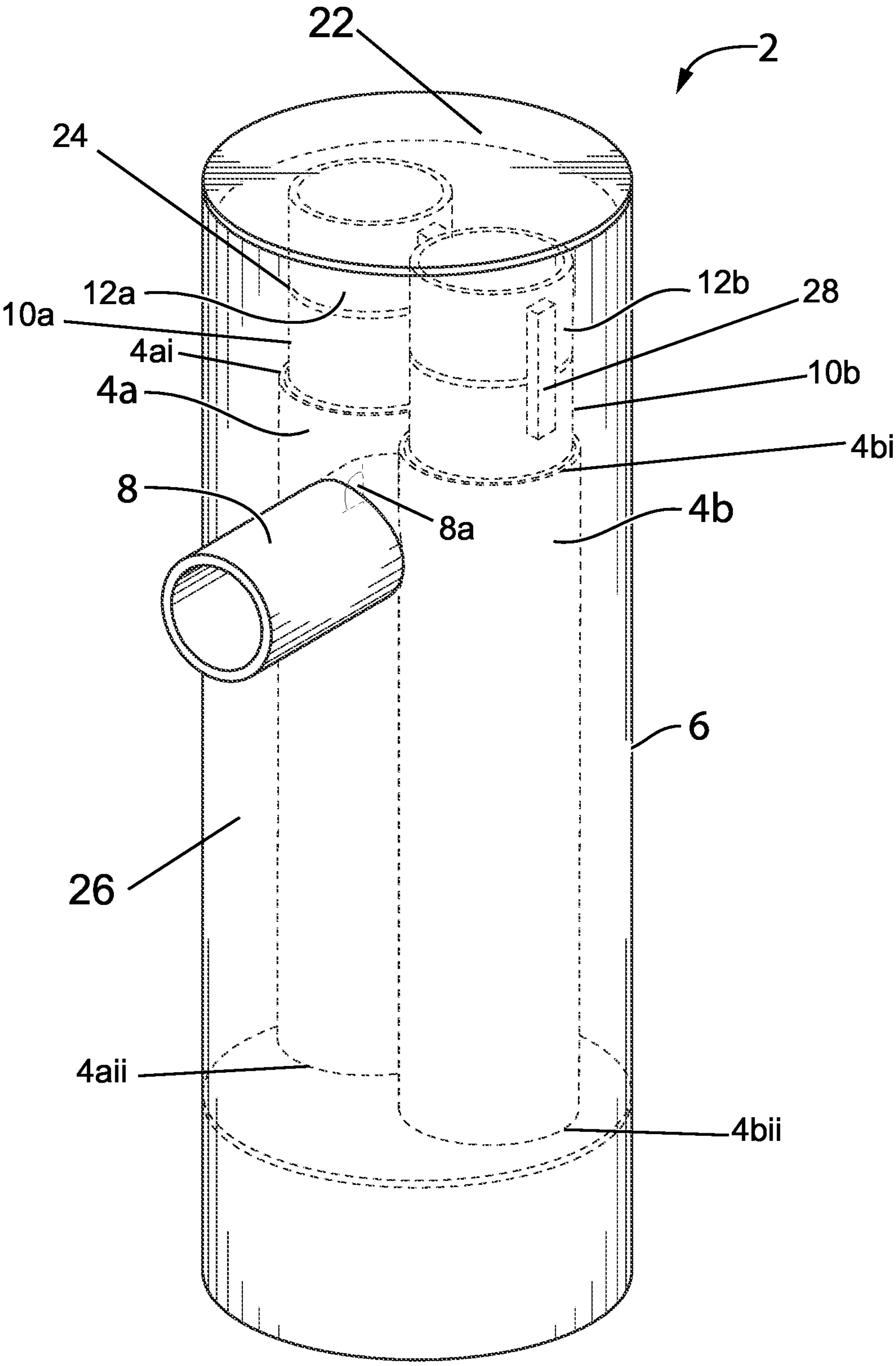
FIG. 1 is a perspective view of one embodiment of the separator system of the present disclosure.
Figure 2:
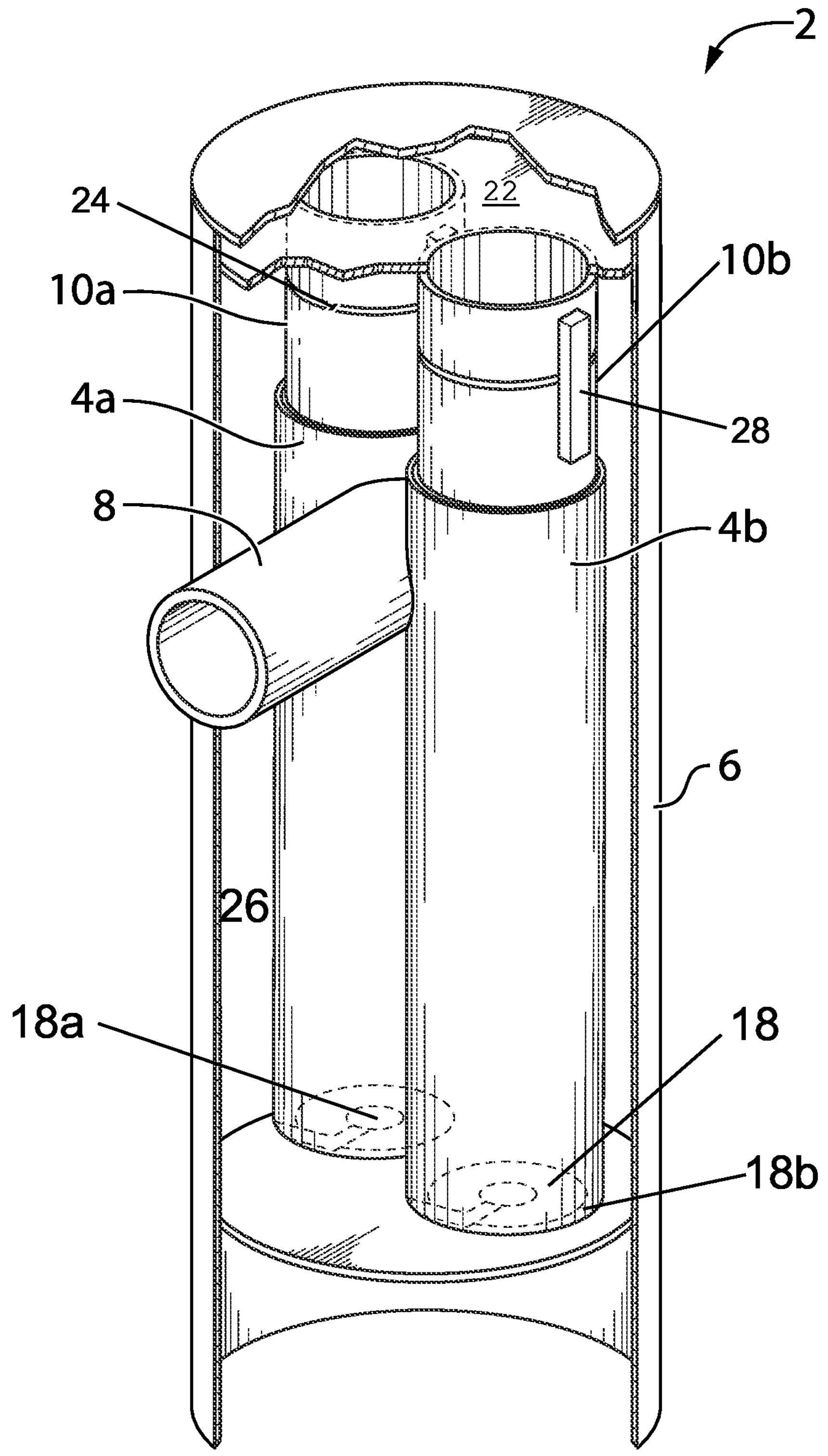
FIG. 2 is a top plan view of one embodiment of the separator system of the present disclosure.
Figure 3:
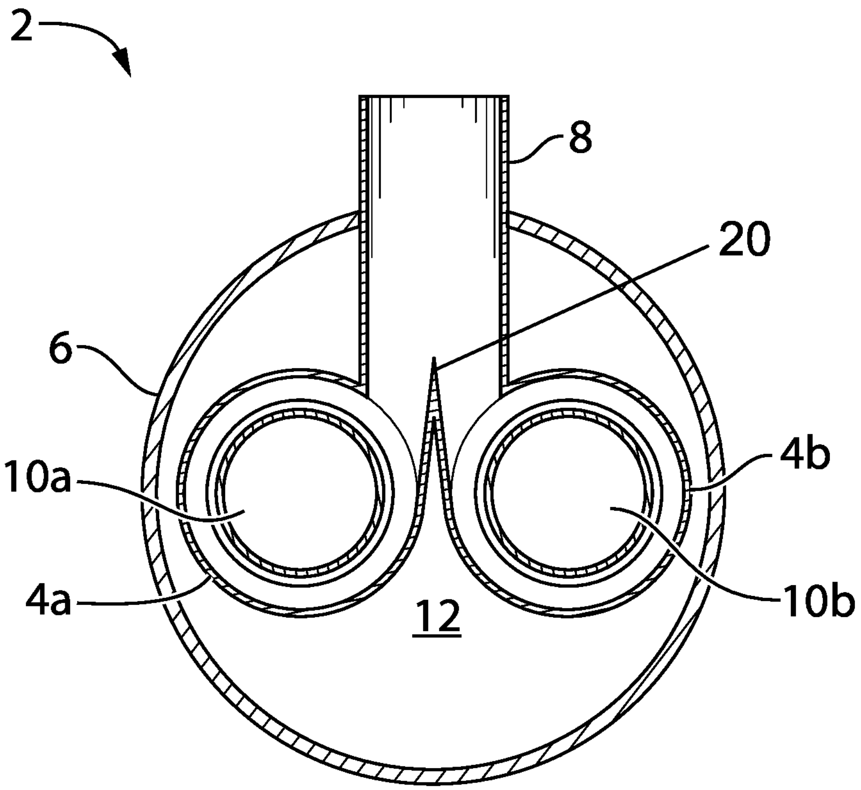
FIG. 3 is a front cross sectional view of one embodiment of the separator system of the present disclosure.

The present tangential inlet 8 connects externally with the outer shell 6 of the system 2, the geometry of the connection can be seen in FIG. 1, which is either curved circle, in the case of circular cross section inlet 8, or a curved rectangle or curved square, in the case of alternate inlet cross sectional geometries. These relatively simple angles and geometries of connection between the tangential inlet 8 and the shell 6 means that welding the inlet 8 to the shell 6 can be done simply without requiring special skill or tools. At the same time the weld can be made securely to meeting safety regulations and welding strength requirements need on external surfaces to which workers are exposed.

Figure 4:
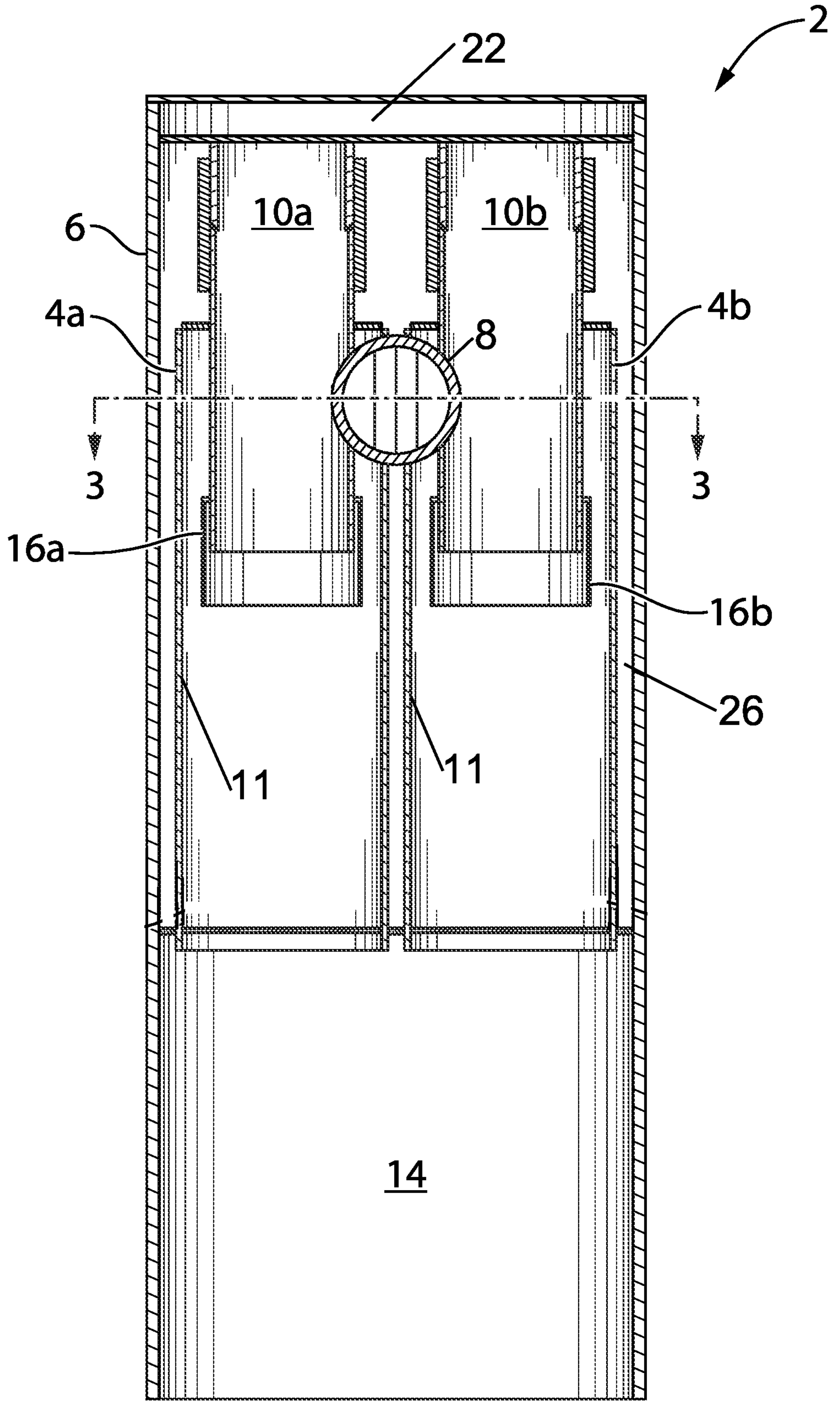
FIG. 4 is a perspective view of the cyclonic chambers of the present disclosure.
Figure 5:
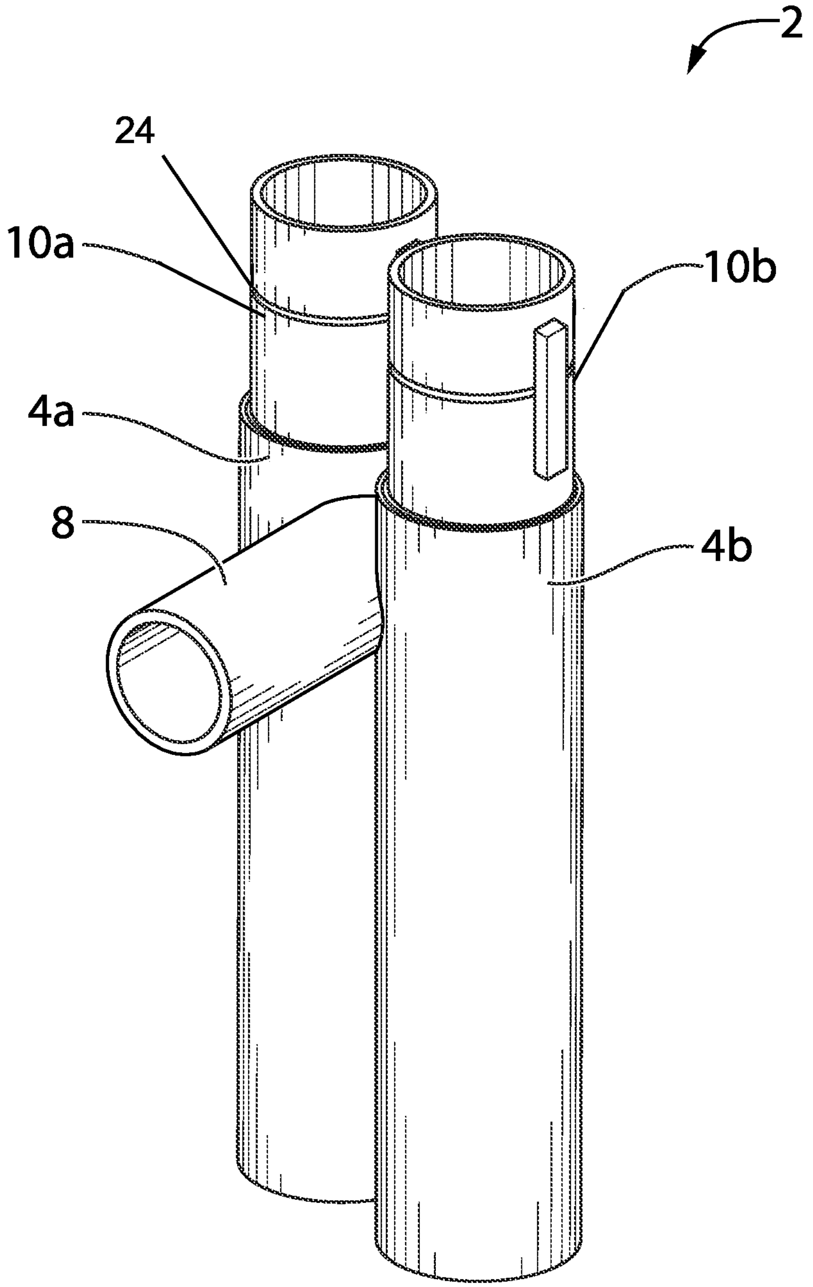
FIG. 5 is a detailed view of the tangential inlet of one embodiment of the present disclosure.

By contrast, internal to the shell 6, the tangential inlet 8 connects with each of the cyclonic chambers 4*a,* 4*b* at a relatively more complex angle and geometry as seen in FIG. 4, which would be much more difficult to weld to external safety regulations and weld strength ratings requirements. However, since the connection of tangential inlet 8 to the cyclonic separator pair 4*a,* 4*b* is internal; the welding of these components can be done without the necessity to meet strict external fabrication and welding requirements.

Figure 6B:
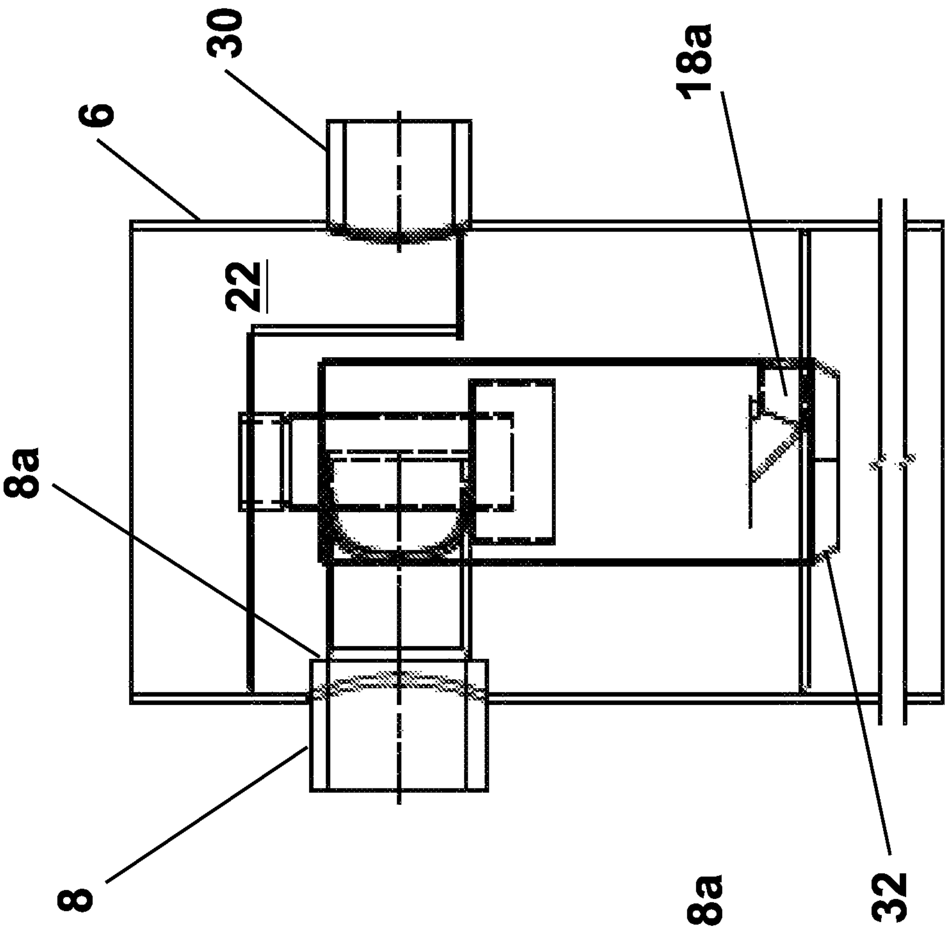
FIG. 6*b* is a side cross sectional view of the separator system of FIG. 6*a;*
Figure 6A:
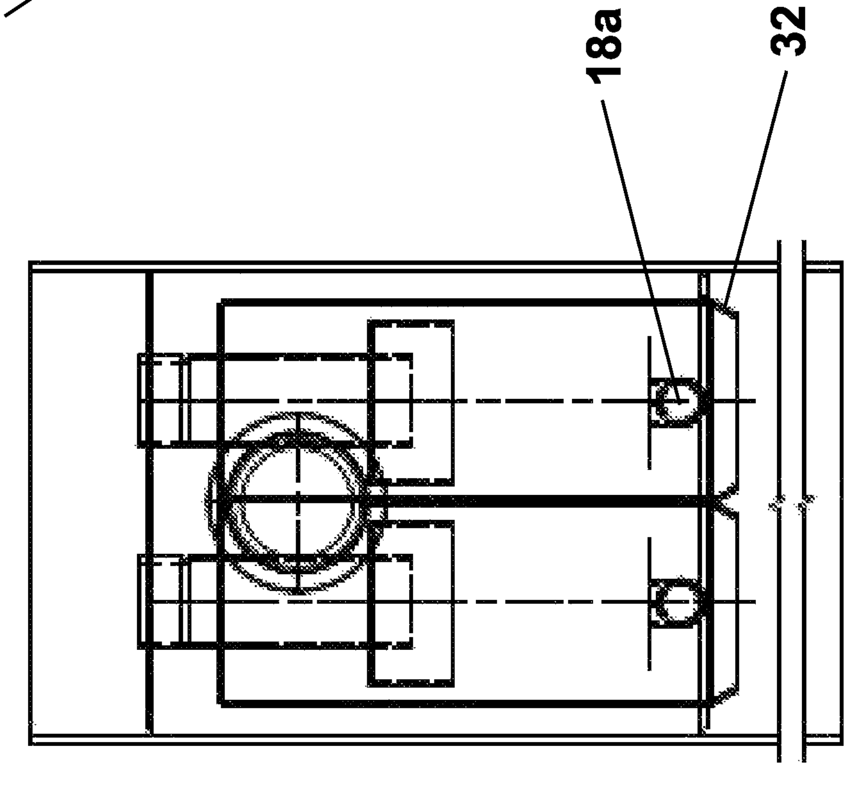
FIG. 6*a* is a front cross sectional view of a further embodiment of the separator system of the present disclosure.
Figure 7B:
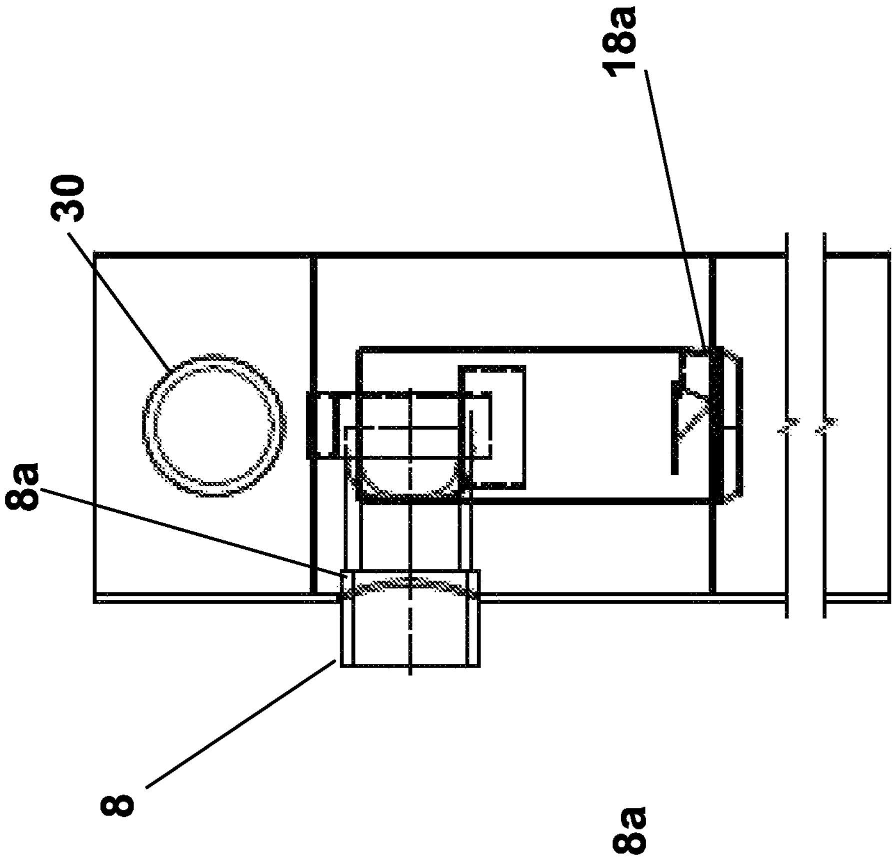
FIG. 7*b* is a side cross sectional view of the separator system of FIG. 7*a.*

As seen in FIGS. 6*b* and 7*b*, the tangential inlet 8 may vary in diameter from a first diameter as it connects to the shell 6 and a second diameter as it connects with the cyclonic chambers. Sizing of the tangential inlet 8 as it enters the cyclonic chambers maybe dictated by process and operational parameters to achieve desired separation based on any number of factors such as fluid properties, residence time, etc. To allow for specific sizing of the second diameter of the tangential inlet 8, while also accommodating potentially pre-existing openings in the shell 6 to receive the tangential inlet 8, a size expansion/reduction 8*a* just inside the shell 6 can be used.

In operation, a process stream comprised of one or more immiscible gases entrained in one or more liquids enters each of the cyclonic chambers 4*a,* 4*b* through the common tangential inlet 8, with the total volume of the process stream substantially equally distributed between each separation column of each cyclonic chambers 4*a,* 4*b.* In a preferred embodiment, the substantially equal distribution of the total volume of the process stream towards each of the cyclonic chambers 4A, 4B. may be facilitated by the divider 20, An inner surface 11 of each of the cyclonic chambers 4*a,* 4*b,* provides a surface against which the process stream is manipulated to move in a helical or cyclonic motion. The cyclonic movement caused by the tangential inlet 8 combined with the inner surface 11 results in heavier, or liquid, phases of the process stream to be forced radially outwardly by centrifugal force towards and against the inner surface 11. The vertical orientation of the cyclonic chambers 4*a*/4*b* allows the force of gravity to act on the heavier phase, pulling it in a helically downwards path along and down the inner surface 11 to the lower end 4*aii*/4*bii* of the cyclonic chambers 4*a*/4*b.*

Preferably, a recycle plate 18 sits in the lower end 4*aii*/4*bii* of the cyclonic chambers 4A, 4B, comprising a central opening 18*a,* and defining an annular opening 18*b* between the inner surface 11 and an edge of the recycle plate 18. The recycle plate 18 serves to stabilize the heavier phase as it exits the cyclonic chambers 4*a*/4*b* through annular opening 18*b*. The recycle plate 18 also serves as part of a recycle system to be described in further detail below.

In a further preferred embodiment the lower ends 4*aii*/4*bii* of the cyclonic chambers 4*a*/4*b* can comprise a slight taper or conical restriction 32. This conical restriction 32 provides a distance or slight separation between heavier phases flowing down from each of the cyclonic chambers 4*a* and 4*b.* The restrictions 32 prevent any interaction between the downward flowing heavier streams, said interaction which can reduce separation efficiency and in some cases allow an undesirable flow of heavier phase back up into a cyclonic chamber 4*a*/4*b*.

With heavier fluids pushed radially outwardly by centrifugal forces towards the inner surface 11 of each cyclonic chamber 4*a*/4*b*, the lighter, or gaseous, phases of the process stream, due to their lower masses and densities, tend to collect substantially in a central core of the cyclonic chambers 4*a*, 4*b* forming a central, upward moving column of lighter, or gaseous, phases that enter gas outlet tubes 10*a*, 10*b* that are located partially within each cyclonic chamber 4*a*, 4*b*.

Figure 7A:
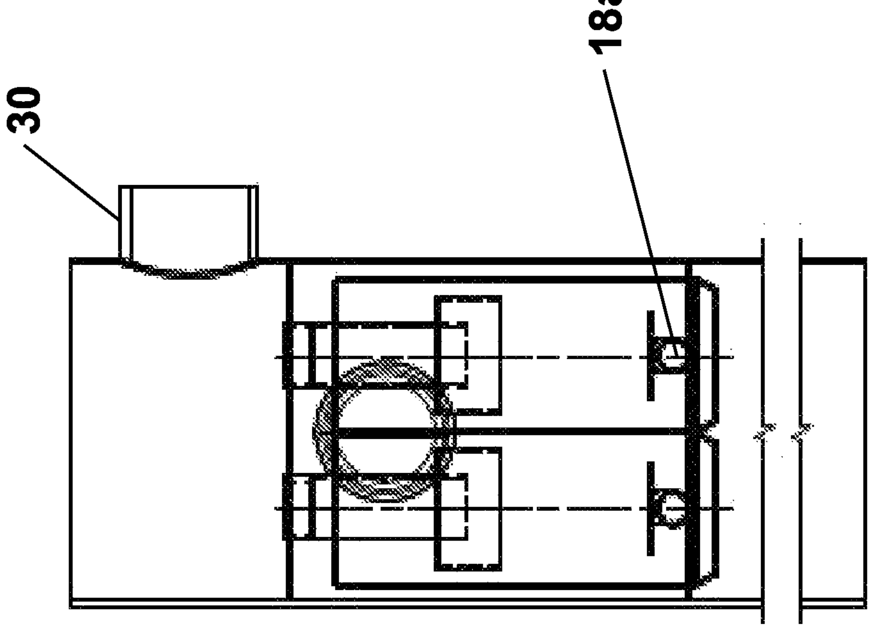
FIG. 7*a* is a front cross section view of yet a further embodiment of the separator system of the present disclosure.

The gas outlet tubes 10*a*, 10*b* extend axially from a lower gas outlet end located below tangential inlet 8, to an upper gas outlet end extending out of the cyclonic chambers 4*a*/4*b*, the upper gas outlet ends being in fluid communication with a common gas chamber 22 formed of an upper end of the shell 6. With reference to FIGS. 6*b*, 7*a* and 7*b* a gas outlet 30 extends from the gas chamber 22. As seen in FIG. 6*b*, the shape of the gas chamber 22 can be modified by baffles to allow the gas outlet 30 to exit from the gas chamber 22 at any orientation or height, including at a height equal to that of the tangential inlet 8. In a similar manner to the tangential inlet 8, the gas outlet 30 is connected to the shell 6 at relatively simple angles and geometries, such that welding the gas outlet 30 to the shell 6 can be done simply without requiring special skill or tools. At the same time the weld can be made securely to meeting safety regulations and welding strength requirements need on external surfaces to which workers are exposed.

In a preferred embodiment, one or more liquid creep preventers 16*a*, 16*b* may be connected around an outside of the lower gas outlet ends of gas outlet tubes 10*a*, 10*b* to ensure that no liquid is misdirected or otherwise allowed to creep upwards and into the gas stream and travel upwards through the gas outlet tubes 10*a*, 10*b*. The liquid creep preventers 16*a*, 16*b* may take any number of forms, it would be well understood by a person of skill in the art that any modification or addition to a lower end of the gas outlet tubes 10*a*, 10*b* that would serve to deflect liquid from the gas outlet tubes 10, 10*b* would be encompassed by the scope of the present disclosure.

Preferably, while each cyclonic chamber 4*a*, 4*b* is independent, the cyclonic chambers 4*a*, 4*b* share a common tangential inlet 6 and also a common liquid sump 14. In a further preferred embodiment of the present disclosure, a common lower area of the outer shell 6 forms the common sump 14, thereby replacing individual sumps for each single cyclonic chamber 4*a*, 4*b*. The common sump 14 collects liquids that flow helically downwardly along the inner surfaces 11 of the cyclonic chambers 4*a*, 4*b*, out the lower ends 4*aii* and 4*bii* of each cyclonic chamber 4*a*/4*b*, vial annular openings 18*b*. The present sump 14 provides a greater volume than the combined volumes of two single separator sumps. The increased volume allows for increased residence time for separation any entrained gases that may be trapped in the falling liquid. This improves separation efficiency and gas recovery. Any released gases from the sump 14 travel upwardly through the central opening 18*a* in recycle plate 18 and then up through gas outlet tubes 10*a*, 10*b*, to the gas chamber 22 and out gas outlet 30.

To reduce the occurrence of entrained liquids in the upwardly travelling separated gas stream, many prior art separator systems make use of an external recycle arm in fluid communication with the gas outlets and extending downwardly to the separator sump. Such external recycle arms require welding to an outer surface of the separator and can affect the integrity of the separator system.

In the present disclosure no such external recycle arm is required. Instead, a circumferential recycle opening 24 is formed around and through a thickness of each gas outlet tube 10*a*/10*b* in a portion of each of the gas outlet tubes 10*a*, 10*b* that extends above the upper ends 4*ai*, 4*bi* of cyclonic chambers 4*a*, 4*b*, but remains below the common gas chamber 22. In this way the recycle opening 24 is within fluid communication of an inside cavity 26 of the outer shell 6. The opening 24 allows for any entrained liquid in the upwards moving gas stream in the gas outlet tubes 10*a*/10*b* to exit the gas outlet tubes 10*a*, 10*b* and enter the inside cavity 26 of the outer shell 6. The inside cavity 26 of the outer shell 6 acts as a recycle area, allowing the exiting liquid to fall through the inside 26 of the shell 6 and down to the sump 14.

Should there be any lighter, or gaseous phase trapped in the exiting liquid travelling down the inside cavity 26 of the shell 6, this is pulled into central opening 18*a* of the recycle system 18 along with any released gases from the sump 14. These then travel upwardly through the central core of the cyclone chambers 4*a*/4*b* and into the lower gas outlet ends of gas outlet tubes 10*a*, 10*b*. In a further preferred embodiment illustrated in FIGS. 6*a*, 6*b*, 7*a* and 7*b*, recycle inlet 18*c* extends from central opening 18*a* and out near the lower end 4*aii*, 4*bii* of the cyclonic chambers 4*a*/4*b* to better capture and direct lighter phases from the sump 14 back into the separator system 2.

In a preferred embodiment, the recycle opening 24 is formed by supporting a gas outlet tube collar 12*a*, 12*b* over each gas outlet tubes 10*a*, 10*b* by means of one or more support brackets 28, providing a gap between the gas outlet tube collar 12*a*, 12*b* and the gas outlet tubes 10*a*, 10*b*, said gap defining the recycle opening 24 to allow exit of entrained liquid from the gas outlet tubes 10*a*, 10*b* out to the inner cavity 26 of the shell 6.

The pairing of the cyclonic chambers 4*a*, 4*b* within the outer shell 6 allows for the shell 6 to be designed shorter, stubbier, and therefore more stable than a single tall, narrow separator that is sensitive to vibration. Since the sizing of cyclonic chambers is a precise science, height and diameter dimensions are limited based on the stream to be separated, velocity and volume available. The present design allows cyclonic chambers 4*a*, 4*b* to be designed to meet process requirements, while the outer shell 6 is designed with stability in mind, thereby achieving both goals.

The outer shell 6 is preferably cylindrical in geometry. It is generally easier and less expensive to manufacture, and is just as efficient or more efficient at separating an inlet stream comprised of immiscible gas and liquid phase than other, more complex and expensive geometries for an cyclonic separators, such as a conical or a frusto-conical geometry.

The previous description of the disclosed embodiments is provided to enable any person skilled in the art to make or use the present disclosure. Various modifications to those embodiments will be readily apparent to those skilled in the art, and the generic principles defined herein may be applied to other embodiments without departing from the spirit or scope of the disclosure. Thus, the present disclosure is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase “means for” or “step for”.

What is claimed is:

1. A cyclonic separator for separation of a mixed liquid phase/gas phase process stream, comprising:

a. an outer shell;

b. at least two cyclonic chambers located within the outer shell, each cyclonic chamber having an upper end and a lower end;

c. a single, common tangential inlet passing through the outer shell and tangentially into each of the at least two cyclonic chambers, proximal the upper ends thereof;

d. a gas outlet tube located at least partially within each cyclonic chamber, extending axially from a lower gas outlet end located within each cyclonic chamber and below the tangential inlet, to an upper gas outlet end extending out of the upper ends of each of the at least two cyclonic chambers, said upper gas outlet ends being in fluid communication with a common gas chamber located above the outer shell; and e. a circumferential recycle opening formed around and through a thickness each gas outlet tube, in a portion of each gas outlet tube located axially between the upper end of cyclonic chambers and the common gas chamber, said recycle opening thus being in fluid communication with an inside cavity of the outer shell.

2. The cyclonic separator of claim 1 wherein an inner surface of each of the at least two cyclonic chambers is configured to receive and spin the liquid phase of the process stream in a helically downwards manner along the inner surface and wherein a central core of each of the at least two cyclonic chambers is configured to receive a central, upward moving column of the gas phase and guide them into the gas outlet tubes.

3. The cyclonic separator of claim 1, wherein common outer shell is sized to provide stability and vibration resistance.

4. The cyclonic separator of claim 1, further comprising a common sump in fluid communication with the lower ends of each of the at least two cyclonic chambers.

5. The cyclonic separator of claim 4, wherein the common sump is formed from a common lower area of the outer shell.

6. The cyclonic separator of claim 5, wherein the inside cavity of the outer shell accommodates liquid phase exiting the recycle opening in each gas outlet tube, and serves to direct the liquid phase into the common sump.

7. The cyclonic separator of claim 6, further comprising recycle system located proximal the lower end each of the at least two cyclonic chambers.

8. The separator of claim 7, wherein said recycle system comprises a flat plate with a central opening for gas phase passage an annular opening for liquid phase passage.

9. The cyclonic separator of claim 8, wherein the recycle system further comprises a recycle inlet extending from the central opening and out of each of the cyclonic chambers, to capture and direct gas phases from the sump back into the cyclonic chambers.

10. The cyclonic separator of claim 1 wherein the recycle opening is formed by a gas outlet tube collar supported over each of the gas outlet tubes by means of one or more support brackets, thus providing a gap between the gas outlet tube collar and the gas outlet tubes said gap defining the recycle opening.

11. The cyclonic separator of claim 1, wherein the tangential inlet varies in diameter from a first diameter external to the outer shell, to a second diameter at a connection point to the cyclonic chambers.

12. The cyclonic separator of claim 1 further comprising a deflector formed in the tangential inlet to divide a process stream into each of the at least two cyclonic chambers.

13. The cyclonic separator of claim 1, wherein the at least two cyclonic chambers each comprise a conical restriction a the lower ends thereof.

14. They cyclonic separator of claim 1, wherein the lower gas outlet end of each of the gas outlet tubes further comprise a liquid creep preventer to prevent ingress of liquid into the lower gas outlet ends of the gas outlet tubes.

* * * * *